United States Patent
Gin et al.

(10) Patent No.: US 7,604,129 B2
(45) Date of Patent: Oct. 20, 2009

(54) LYOTROPIC LIQUID CRYSTAL NANOFILTRATION MEMBRANES

(75) Inventors: Douglas L. Gin, Longmont, CO (US); Meijuan Zhou, Boulder, CO (US); Richard D. Noble, Boulder, CO (US)

(73) Assignee: The Regents of the Univeristy of Colorado, a body corporate, Denver, CO (US)

(*) Notice: Subject to any disclaimer, the term of this patent is extended or adjusted under 35 U.S.C. 154(b) by 611 days.

(21) Appl. No.: 10/529,409

(22) PCT Filed: Oct. 3, 2003

(86) PCT No.: PCT/US03/31429

§ 371 (c)(1), (2), (4) Date: Aug. 22, 2005

(87) PCT Pub. No.: WO2004/060531

PCT Pub. Date: Jul. 22, 2004

(65) Prior Publication Data

US 2006/0096922 A1  May 11, 2006

Related U.S. Application Data

(60) Provisional application No. 60/416,077, filed on Oct. 3, 2002.

(51) Int. Cl.
  *B01D 39/00* (2006.01)
  *B01D 29/00* (2006.01)
  *C25D 1/08* (2006.01)

(52) U.S. Cl. ............ 210/490; 210/500.27; 210/500.41; 210/500.38; 205/67; 264/41

(58) Field of Classification Search ............ 210/500.27, 210/490, 500.41, 500.38; 205/67; 264/41
See application file for complete search history.

(56) References Cited

U.S. PATENT DOCUMENTS

| 4,614,524 A | 9/1986 | Kraus |
| 5,238,613 A | 8/1993 | Anderson |
| 5,238,992 A | 8/1993 | Outubuddin |

(Continued)

FOREIGN PATENT DOCUMENTS

WO  WO 98/30318  7/1998

OTHER PUBLICATIONS

Beginn et al. (2000) "Membranes Containing Oriented Supramolecular Transport Channels," *Adv. Mater.* 12:513-516.

(Continued)

*Primary Examiner*—Ana M Fortuna
(74) *Attorney, Agent, or Firm*—Greenlee, Winner and Sullivan, P.C.

(57) ABSTRACT

The invention provides composite nanofiltration membranes (FIG. 5) with lyotropic liquid crystal (LLC) polymer porous membranes (30) attached to a porous support (20). The LLC membranes are prepared from LLC monomers which form the inverted hexagonal or bicontinuous cubic phase. The arrangement, size, and chemical properties of the pores can be tailored on the molecular level. The composite membrane of the invention is useful for separation processes involving aqueous and nonaqueous solutions as well as gases. Methods for making and using the composite nanofiltration membranes of the inventions are also provided.

30 Claims, 7 Drawing Sheets

U.S. PATENT DOCUMENTS

| | | | |
|---|---|---|---|
| 5,670,051 | A | 9/1997 | Pinnau et al. |
| 5,849,215 | A * | 12/1998 | Gin et al. ............... 252/299.01 |
| 5,900,292 | A | 5/1999 | Moriya et al. |
| 6,054,111 | A | 4/2000 | Antonietti et al. |
| 6,264,741 | B1 | 7/2001 | Brinker et al. |
| 6,503,382 | B1 * | 1/2003 | Bartlett et al. ................ 205/67 |
| 6,586,561 | B1 | 7/2003 | Litt et al. |
| 6,696,113 | B2 | 2/2004 | Kawata et al. |
| 7,090,788 | B2 * | 8/2006 | Elliott ................... 252/299.01 |
| 7,166,161 | B2 * | 1/2007 | Lazarev et al. ................. 117/4 |
| 7,371,887 | B2 * | 5/2008 | Stupp et al. .................... 560/57 |
| 2006/0194927 | A1 | 8/2006 | Gin et al. |
| 2008/0029735 | A1 | 2/2008 | Gin et al. |
| 2008/0319202 | A1 | 12/2008 | Gin et al. |

OTHER PUBLICATIONS

Beginn et al. (2000) "Functional Membranes Containing Ion-Selective Matrix Fixed Supramolecular Channels," *Adv. Mater.* 12:510-516.

Beginn, U. (1998) "Supramolecular Templates as Porogenes," *Adv. Mater.* 10(16):1391-1394.

Clark et al. (1999) "Polymerization of Organized Polymer Assemblies," *Curr. Opin. Colloid Interface Sci.* 4:122-129.

Deng et al. (1998) "Polymerizable Lyotropic Liquid Crystals Containing Transition-Metal and Lanthenide Ions: Architectural Control and Introduction of New Properties into Nanostructured Polymers," *J. Am. Chem. Soc.* 120(14):3522-3523.

DePierro et al. (2004) "Generation and Control of Polymer Nanostructures Through Photopolymerization in Lyotropic Liquid Crystalline Media," *Radtech Rep.* :11-21.

Eastoe et al. (2000) "Control Over Phase Curvature Using Mixtures of Polymerizable Surfactants," *Chem. Mater.* 12:3533-3537.

Gankema et al. (1996), "Gel Template Leaching: An approach to Functional Nanoporous Membranes," *Macromol. Symp.*, 102, 301.

Gin et al. (1999) "Polymerizable Liquid Crystals as Building Blocks for Functional, Nanostructured Materials," *Synthetic Lett.* 10:1509-1522.

Gin et al. (Oct. 2001) "Polymerized Lyotropic Crystal Assemblies for Materials Applications," *Acc. Chem. Res.* 34:973-980.

Gray et al. (1998) "Polymerizable Lyotropic Liquid Crystals Containing Transition-Metal Ions as Building Blocks for Nanostructured Polymers and Composites," *Chem. Mater.* 10(7):1827-1832.

Gu et al. (Jun. 2001) "A Nanostructured, Scandium-Containing Polymer for Heterogeneous Lewis Acid Catalysis in Water," *Chem. Mater.* 13(6):1949-1951.

International Search Report for PCT/US0331429.

Jung et al. (Feb. 2001) "Polymerization in Lyotropic Liquid-Crystalline Phases of Dioctadecyldimethylammonium Bromide," *Colloid Polym. Sci.* 279:105-113.

Lee et al. (1995) "Polymerization of Non-Lamellar Assemblies," *J. Am. Chem. Soc.* 177:5573-5578.

Liu et al. (1998) "Diblock Thin Film with Densely Hexagonally Packed Nanochannels," *Adv. Mater.* 10:69-.

Liu et al. (2000) "Nanofiltration Membranes Prepared by Direct Microemulsion Copolymerization Using Poly(Ethylene Oxide) Macromonomer as a Polymerizable Surfactant," *J. Appl. Polym. Sci.* 77:2785-2794.

McGrath, K.M. (1996) "Polymerization of Liquid Crystalline Phases in Binary Surfactant/Water Systems. Part 2. ω-undecenyltrimethylammonium Bromide," *Colloid Polym. Sci.* 274:399-409.

Miller et al. (1999) "Nanostructured Materials Based on Polymerizable Amphipliles," *Curr. Opin. Colloid Interface Sci.* 4:338-347.

Miller et al. (1999) "Heterogeneous Catalysis with Cross-Linked Lyotropic Liquid Crystal Assemblies: Organic Analogues to Zeolites and Mesoporous Sieves," *Angew. Chem. Int. Ed.* 38(20):3021-3026.

O'Brien et al. (1998) "Polymerization of Preformed Self-Organized Assemblies," *Acc. Chem. Res.* 31:861-868.

Paleos, C.M. (1992) "Polymerization of Micelle-Forming Monomers," In; *Polymerizations in Organized Media*, Gordon and Breach, Philadelphia, pp. 183-214.

Pindzola et al. (2000), "Lyotropic Liquid-Crystalline Phase Behavior of Some Alkyltrimethylphosphonium Bromides", Langmuir, 16, 6750-6753.

Pindzola et al. (2001) "Polymerization of Phosphonium-Diene Based Gemini Surfactants in the Regular Hexagonal and Bi-Continuous Cubic Phases," *Abstracts of Papers of the Am. Chem. Soc.* $22^{nd}$ National Meeting, Aug. 26-30, Chicago, Il.

Pindzola et al. (Apr. 2001) "Polymerization of a Phosphonium Diene Amphile in the Regular Hexagonal Phase with Retention of Microstructure," *J. Am. Chem. Soc.* 123(19):4617-4618.

Pindzola et al. (Feb. 2003) "Cross-Linked Normal Hexagonal and Bicontinuous Cubic Assemblies via Polymerizable Gemini Amphiphiles," *J. Am. Chem. Soc.*, 125, 2940-2949.

Resel et al. (2000) "Structural Properties of Polymerized Lyotropic Liquid Crystal Phases of 3,4,5-Tris(ω-acryloxyaclkoxy)benzoate Salts," *Macromol. Chem. Phys.* 201(11):1128-.

Smith et al. (1997) "Ordered Poly-(p-phenylenevinylene) Matrix Nanocomposites via Lyotropic Liquid-Crystalline Monomers," *J. Am. Chem. Soc.* 119:4092-4093.

Srisiri et al. (1997) "Polymerization of the Inverted Hexagonal Phase," *J. Am. Chem. Sic.* 119:4866-4873.

Thundathil et al. (1980) "Polymerization in Lyotropic Crystals. I. Change of Structure During Polymerization," *J. Polym. Sci. Polym. Chem. Ed.* 18:2629-2640.

Zhou et al. (2005) "Supported Lyotropic Liquid-Crystal Polymer Membranes: Promising Materials for Molecular-Size-Selective Aqueous Nanofiltration," *Adv. Mater.* 17(15), 1850-1853.

Zhou et al. (2007) "New Type of Membrane Material for Water Desalination Based on a Cross-Linked Bicontinuous Cubic Lyotropic Liquid Crystal Assembly", *J. Am. Chem. Soc.*, 129 (31), 9574-9575.

\* cited by examiner $H_{II}$ phase (m + n = 15)

(mixture of regio-isomers)

$H_{II}$ phase (x + y = 15)

(pure regio-isomers)

$H_{II}$ phase $H_{II}$ phase

6 n = 8, 10, 14

L, H$_I$, Q$_{II}$ phases

LYOTROPIC LIQUID CRYSTAL NANOFILTRATION MEMBRANES

CROSS-REFERENCE TO RELATED APPLICATIONS

This application is the National Stage of International Application No. PCT/US2003/031429, filed Oct. 3, 2003, which claims the benefit of U.S. Provisional Application No. 60/416,077, filed Oct. 3, 2002.

STATEMENT REGARDING FEDERALLY SPONSORED RESEARCH OR DEVELOPMENT

This application was made at least in part with government support under Office of Naval Research Grant N00014-02-1-0383. The United States government has certain rights in this invention.

BACKGROUND OF THE INVENTION

This invention is in the field of composite nanofiltration membranes, in particular composite nanofiltration membranes employing at least one lyotropic liquid crystal polymer porous membrane on a porous support.

Polymer membranes based on lyotropic liquid crystal (LLC) mesogens are of interest because of the ability of LLC mesogens to self-assemble into ordered, nanoporous aggregate structures in the presence of a solvent such as water. The aggregates can be relatively highly ordered yet fluid condensed assemblies with specific nanometer-scale geometries, known collectively as LLC phases (Gin et. al., "Polymerized Lyotropic Liquid Crystal Assemblies for Materials Applications," 2001, Acc. Chem. Rec. 24, 973-980). LLC mesogens are amphiphilic molecules containing one or more hydrophobic organic tails and a hydrophilic headgroup. Surfactants can be classified as amphiphiles (D. Considine, ed., Van Nostrand's Scientific Encyclopedia, Seventh Edition, 1989, Van Nostrand Reinhold, New York, p. 861).

Polymer membranes based on LLC mesogens have been reported. Beginn et al. reported membranes containing ion-selective matrix-fixed supramolecular channels (Beginn, U.; Zipp, G.; Möller, M. "Functional Membranes Containing Ion-Selective Matrix Fixed Supramolecular Channels," Adv. Mater. 2000, 12, 510). Solutions of 2-hydroxymethyl-[1,4,7,10,13-pentaoxacyclopentadecane]-3,4,5-tris[4-(11-methacryloylundecyl-1-oxy)benzyloxy]benzoate, a tris-methacrylated crown ether amphiphile, in a mixture of monomers, cross-linkers, and a photo-initiator were reportedly cast to thin films on a supporting porous filter (Pall Filtron NOVA membrane with maximum pore size of 10 microns). The mixture was subsequently cooled to −50° C. on a temperature-controlled aluminum block and then polymerized. The cross-section of the supported membrane reportedly showed that the support was completely filled with the cross-linked methacrylate. The supramolecular channels were reportedly formed by self-assembly of the tris-methacrylated crown ether amphiphile into long cylindrical aggregates with the crown ether moieties stacked parallel to the column axis and the polymerizable groups forming the shell of the cylinder.

Beginn et al. also reported membranes containing oriented supramolecular transport channels (Beginn, U.; Zipp, G.; Mourran, A., Walther, P., and Möller, M. "Membranes Containing Oriented Supramolecular Transport Channels," Adv. Mater. 2000, 12, 513-516.). The membranes were synthesized by filing the 400 nm wide pores of a track-etched polyester membrane with a hot isotropic methacrylate solution of 2-hydroxymethyl-[1,4,7,10,13-pentaoxacyclopentadecane]-3,4,5-tris[4-(11-methacryloylundecyl-1-oxy)benzyloxy]benzoate, a tris-methacrylated crown ether amphiphile (60 wt.-%). The filled polyester membrane was cooled below the isotropization temperature of the lyotropic solution and the solution polymerized.

WO 98/30318 to Gin et al. states that polymer membranes can be formed from amphiphilic LLC monomers that will self-organize into stable, inverse hexagonal phases in the presence of pure water or other hydrophilic solutions. It was further stated that in situ photopolymerization of the hydrophobic tails into a heavily cross-linked network with retention of the template microstructure yields a robust polymer network with highly uniform pores arranged in a regular hexagonal array. Formation of a polymer film between two glass slides by photopolymerization of a LLC monomer mixture was reported. It was further reported that the film could be peeled off the glass slides in one piece.

U.S. Pat. No. 5,238,613 to Anderson reports polymeric membrane materials having a pore size between two nanometers and sixty microns. The porosity of the membrane materials is reported to be greater than fifty percent. U.S. Pat. No. 5,238,613 states that binary water/polymerizable surfactant bicontinuous cubic LLC phases could provide a route for membrane formation.

A need continues to exist for polymer membrane manufacturing technologies which allows control of critical structural features such as pore size, pore architecture, and pore density in the nanometer size regime. A need also exists for polymer membranes for which these critical structural features can be controlled on this extremely important size scale.

SUMMARY OF THE INVENTION

In an embodiment, the invention provides a composite nanofiltration membrane comprising: a porous support; and a LLC polymer porous membrane attached to the support. In an embodiment, the porous support is ultraporous. In an embodiment, the pore size of the LLC polymer membrane is monodisperse and between about 0.5 and about 5.0 nanometers. The LLC polymer porous membrane typically forms a coating on the porous support.

The composite membrane of the invention is useful for separation processes involving aqueous and nonaqueous solutions as well as gases. The composite membrane can also be made in flexible form, which allows it to be used in a variety of membrane configurations (e.g. spiral-wound).

The present invention creates nanostructured porous polymer membranes in which the arrangement, size, and chemical properties of the pores may be tailored on the molecular level by using polymerizable lyotropic (i.e., amphiphilic) liquid crystals (LCs) as building blocks. These materials can act as novel nanoporous membranes capable of selectively removing nanometer-size impurities, organic molecules, certain ions, and other contaminants from solutions based solely on molecular size. In addition, the incorporation of chemical complexing agents in the nanopores of these materials can enable other forms of separation processes.

The invention also provides a method for making nanofiltration membranes which can be simpler than that for making currently available nanofiltration membranes. In an embodiment, the invention provides a method for making a composite nanofiltration membrane comprising the steps of: providing a porous support, preparing a solution comprising a LLC monomer, an organic solvent for the monomer, and water, wherein the organic solvent is selected to be compatible with the support; applying a layer of the solution onto the porous support; evaporating the solvent from the solution; and cross-linking the LLC monomer. In an embodiment, the layer of solution is applied to the porous support by roller casting.

DETAILED DESCRIPTION OF THE INVENTION

In an embodiment, the invention provides a composite nanofiltration membrane comprising: a porous support; and a LLC polymer porous membrane attached to the support. As used herein, a "membrane" is a barrier separating two fluids that allows transport between the fluids. A "fluid" may be a liquid or a gas. A "composite" membrane comprises a membrane combined with a porous support.

As used herein, "nanoporous" signifies a pore size between about 0.5 and about 6 nm in diameter and a "nanofiltration membrane" has an effective pore size between about 0.5 and about 6 nm. "Ultraporous" signifies a pore size between about 2.5 and about 120 nm and an "ultrafiltration membrane" has an effective pore size between about 2.5 and about 120 nm. "Microporous" signifies a pore size between about 45 nm and about 2500 nm and a "microfiltration membrane" has an effective pore size between about 45 nm and about 2500 nm. The effective pore size of a membrane is the pore size of the part of the membrane which performs most of the separation function. For the composite nanofiltration membranes of the invention, the LLC porous membrane is a nanofiltration membrane while the porous support has a larger average pore size. In an embodiment, the LLC porous membrane has a pore size between about 0.5 and 5.0 nm. In an embodiment, the porous support is ultraporous.

As used herein, a "LLC polymer" is composed of polymerized lyotropic liquid crystal monomers in an ordered assembly. As used herein, "LLC monomers" are polymerizable amphiphilic molecules that spontaneously self-assemble into fluid, yet highly ordered matrices with regular geometries of nanometer scale dimension. LLC mesogens are amphiphilic molecules containing one or more hydrophobic organic tails and a hydrophilic headgroup.

LLC monomers useful for the present invention are those that form an LC phase in the presence of water that contains ordered, monodisperse, aqueous nanopores, and those that can be polymerized into a cross-linked network with substantial retention of the original LC phase microstructure. As used herein, "nanometer scale dimension" refers to pore dimensions between about 0.5 and about 5 nm. LLC monomers useful for the present invention can form aqueous nanopores having a diameter between about 0.5 and about 5 nm. As used herein, a "monodisperse" pore size has a variation in pore size from one pore to another of less than ca 15% (specifically an ideally narrow Poisson distribution). For pores formed by some LC phases (e.g. bicontinuous cubic phases), the pore size of a given pore will vary along the pore channel. For pores whose dimensions vary along the pore channel, a comparison of pore sizes is made at equivalent positions along the channel.

Figure 1:
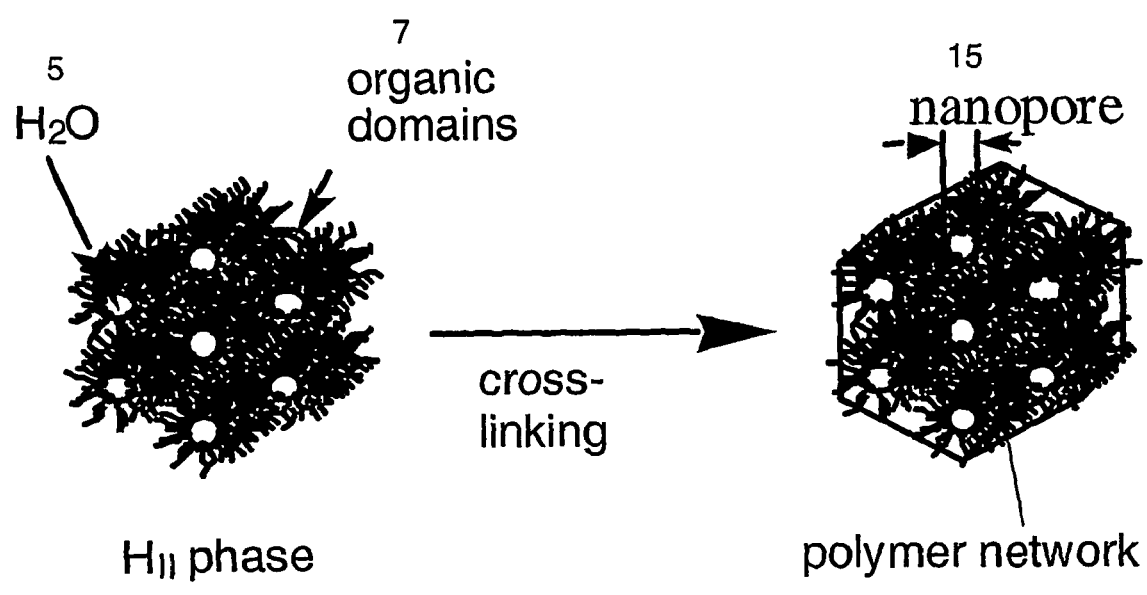
FIG. 1 illustrates cross-linking of an inverted hexagonal ($H_{II}$) LLC phase to form a polymer network containing hexagonally packed water-filled nanopores.

Polymerizable LLCs (i.e., cross-linkable surfactants) have been designed that spontaneously form the inverted hexagonal ($H_{II}$) LLC phase in the presence of a small amount of water. FIG. 1 schematically illustrates aqueous nanopores (5) and organic domains (7) in the $H_{II}$ LLC phase. Upon photo-polymerization or photo-cross-linking, robust polymer networks (17) containing hexagonally packed, extended water channels (15) with monodisperse diameters of nanometer-scale dimensions are produced (FIG. 1). The network has a pore structure of hexagonally ordered, cylindrical nanopores. The pore structure is substantially determined or controlled by the inverted hexagonal phase which was formed by the monomers. There is typically some contraction of the structure, approximately 5 vol %, on heavy cross-linking of the polymer into a network. A slight decrease in x-ray diffraction spacings was seen in the $H_{II}$ phase after polymerization. If formed into a polymer film, these networks can be used as membranes. The resulting membranes may contain polydomains.

Figure 2:
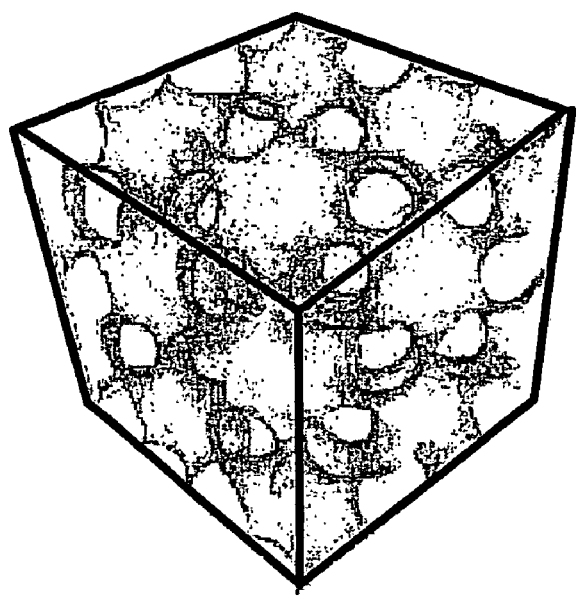
FIG. 2 illustrates a bicontinuous cubic (Q) LLC phase.

Different porous architectures can be achieved via the use of other LLC monomers that form different mesophases. For example, polymerizable LLC phases with bicontinuous cubic (Q) architectures have interconnected 3-D nanochannels (FIG. 2). In this case, the polymerized network has a pore structure of interconnected, ordered 3-D nanopores. The pore structure is substantially determined or controlled by the bicontinuous cubic phase which was formed by the monomers.

Figure 3:
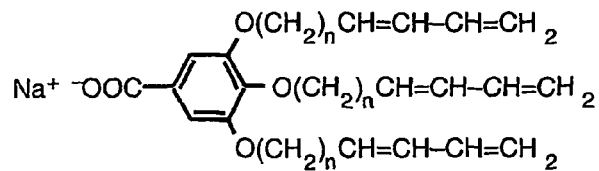
FIG. 3 shows several $H_{II}$ forming monomers.
Figure 3:
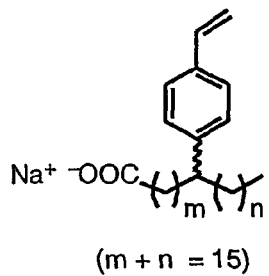
Figure 3:
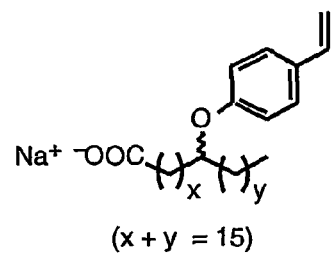
Figure 3:
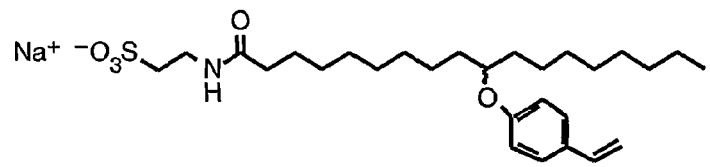

Several polymerizable LLCs (i.e., cross-linkable surfactants) have been designed that spontaneously form the inverted hexagonal ($H_{II}$) LC phase in the presence of a small amount of water (Gin et al. (2001) Acc. Chem. Res. 34, 973-980; U.S. Pat. No. 5,849,215; WO 98/30318). Without wishing to be bound by any particular theory, it is believed that amphiphiles with a tapered shape (i.e. a small hydrophilic headgroup and a broad flattened hydrophobic tail section) should prefer to pack to form the $H_{II}$ phase. In one embodiment, monomer 1 is used as the polymerizable LLC. Monomer 1 forms a cross-linked $H_{II}$ phase with hexagonally ordered, cylindrical water pores that are approximately 1.2 nm in diameter and monodisperse in size. A synthesis method for monomer 1 is disclosed in U.S. Pat. No. 5,849,215 and WO 98/30318. Other LLC monomers that form the $H_{II}$ phase and/or derivatives of monomer are shown in FIG. 3 (Gin et al. (2001) Acc. Chem. Res. 34, 973-980). It should be noted that these monomers can be made with different tail lengths and head groups, which alter the nanopore dimensions. Also, mixtures of the aforementioned LLC monomers can also be produced to tailor pore dimensions (Smith, R. C., Ph.D. Thesis (1999), University of California, Berkeley).

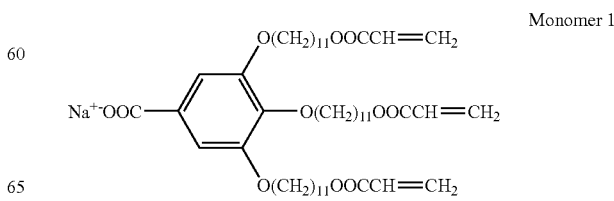

Monomer 1

Figure 4:
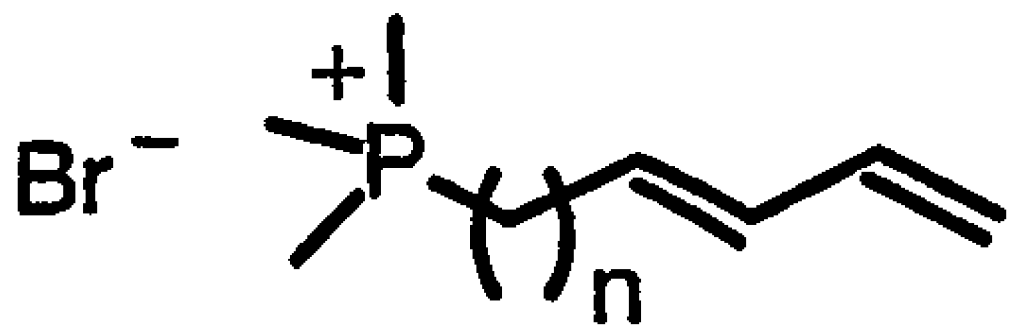
FIG. 4 illustrates a monomer capable of forming L, $H_I$ and $Q_{II}$ phases.

Polymerizable LLCs have also been designed that spontaneously form the bicontinuous cubic (Q) LC phase. These mesogens include Gemini surfactant monomers. Monomer 2 forms a bicontinuous cubic phase (Pindzola, B. A., Ph.D. Thesis (2001), University of California, Berkeley). A single tailed version of monomer 2 exhibits similar behavior but requires added cross-linker to form a cubic network upon photopolymerization (Pindzola, B. A.; Hoag, B. P.; Gin, D. L. *J. Am. Chem. Soc.* 2001, 123 (19), 4617-4618.) (FIG. 4).

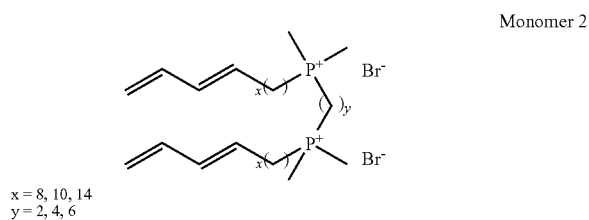

Monomer 2 x = 8, 10, 14
y = 2, 4, 6

The pore size of the nanoporous LLC assemblies can be tuned via modification of the parent LC monomer. (Resel, R; Leising, G.; Markart, P.; Kreichbaum, M.; Smith, R.; Gin, D. "Structural Properties of Polymerised Lyotropic Liquid Crystal Phases of 3,4,5-Tris(ω-acryloxyalkoxy)benzoate Salts," *Macromol. Chem. Phys.* 2000, 201 (11), 1128). It is believed that the pore size for $H_{II}$ phases can be tuned within the range 0.5-2.0 nm. It is believed that the pore size for bicontinuous cubic phases can extend up to 5 nm. Pore size and pore architecture may also be tuned by changing temperature, pressure, and mixture composition, since LLC phase behavior is known to depend on all three parameters.

The LLC polymer porous membrane is attached to the porous support. In a preferred embodiment, the LC membrane is formed in situ as a coating on at least a part of the surface of the porous support and the attachment between the membrane and the support is made during the membrane fabrication process. The thickness of the membrane can be measured as the coating thickness. In situ formation of the LLC membrane is preferred for membranes thin enough that the membranes would be expected to tear during transfer of the membrane from one membrane to another. It is expected that the membrane thicknesses of interest for the present invention would be susceptible to tearing when peeled from a substrate. Without wishing to be bound by any particular theory, the attachment between the LLC membrane and the support during in situ fabrication may result from mechanical interlocking of the LLC membrane and the support due to penetration of the LLC material into the pores of the support during fabrication of the LLC membrane.

The porous support membrane gives physical strength to the composite structure. The porous support is selected to be robust enough to withstand the pressure differential applied across it during filtration, typically up to 100 psi (0.6895 MPa). The support should also be thermally stable over approximately the same temperature range as the LLC membranes to be used.

The support is also selected so that it is permeable to the liquid or gas to be filtered. Preferably, the porous support membrane has a smaller flow resistance than the LLC membrane. The surface pore size should be sufficiently small and the support surface sufficiently smooth that the LLC polymer can form a continuous coating. The porous support in this system is selected so that the diameter of the pores is less than about 10 microns. The preferred pore size of the support may depend on the composition of the casting solution. In an embodiment, the porous support is an ultraporous membrane. In another embodiment, the support has a pore size less than about 0.1 micron.

The support is selected to be compatible with the solution used for LC membrane formation, as well as to be compatible with the liquid or gas to be filtered. When the solution used for LC membrane fabrication and the support are compatible, the support is resistant to swelling and degradation by the solution used to cast the LC polymer porous membrane. In particular, the organic solvent used in the solution and the support are selected to be compatible so that the support is substantially resistant to swelling and degradation by the organic solvent. Swelling and/or degradation of the support by the solvent can lead to changes in the pore structure of the support. If the membrane is to be used for water based separations, the porous support is sufficiently hydrophilic for water permeation.

The porous support may be made of any suitable material known to those skilled in the art including polymers, metals, and ceramics. In various embodiments, the porous support is a polyacrylonitrile (PAN), polyacrylonitrile-co-polyacrylate, polyacrylonitrile-co-methylacrylate, polysulfone (PSf), Nylon 6, 6, poly(vinylidene difluoride), or polycarbonate support. The support may also be an inorganic support such as a nanoporous alumina disc (Anopore™ Whatman, Ann Arbor, Mich.). The porous support may also be a composite membrane.

For the $H_{II}$ films, the flux through the LC polymer membrane is improved when the nanopores are open, aligned and continuous throughout the LC polymer film. For polydomain, cross-linked $H_{II}$ films, not all of the nanopores are necessarily open, aligned, and continuous throughout the film. The alignment of the nanopores is generally improved by decreasing the LC polymer membrane thickness. Additional alignment techniques known to those skilled in the art which are compatible with the LC polymer membrane processing techniques described herein may also be employed, for example application of external forces (for example, shear forces), interactions with surfaces, and applications of large magnetic or electric fields. For the $H_{II}$ LC polymer membranes used in the present invention, it is preferred that the membrane thickness be less than about 10 microns. In different embodiments, the $H_{II}$ LC polymer membrane thickness may be less than about 5 microns, less than about 2 microns, less than about 1 micron, or less than about 0.5 microns. In different embodiments, the Q LC polymer membrane thickness may be less than about 10 microns, less than about 5 microns, less than about 2 microns, less than about 1 micron or less than about 0.5 microns.

The flux rate through the composite membrane as a whole depends upon the pressure differential applied across the membrane as well as on the permeability of the LLC polymer membrane. The composite membranes of the invention are capable of sustaining pressure differences of greater than 50 psi (0.3447 MPa) and obtaining aqueous solution flux rates greater than about 0.2 kg/m² hour. It is believed that unsupported LLC membranes with thicknesses less than about 100 microns would be unable to withstand this pressure differential.

Furthermore, the LC polymer membrane can be fabricated with chemical complexing agents in the nanopores. These chemical complexing agents may be inorganic or organic entities that have the ability to interact reversibly or irreversibly with various solutes that enter the membrane. These chemical complexing agents may include, but are not limited to, metal ions such as $Cu^+$, $Cu^{2+}$, $Ag^+$, $Co^{2+}$, $Sc^{3+}$, and amine functionalities.

A variety of methods can be used to prepare the composite nanofiltration membrane comprising a porous LC polymer membrane on a porous support. One method for making the composite nanofiltration membranes of the invention comprises the steps of: providing a porous support; preparing a solution comprising a LLC monomer, an organic solvent for the monomer, and water; applying a layer of the solution onto a porous support; evaporating the solvent from the solution; and cross-linking the LLC monomer. If desired, more than one layer of solution may be applied to the support to form multiple layers of porous LC polymer and thereby control the film thickness.

The solution used for applying the lyotropic LLC monomer, also known as the "casting solution", comprises a lyotropic LLC monomer, an organic solvent, water, a polymerization initiator that can be photolytically or thermally activated, and an optional cross-linking agent. The solvent may be any low boiling point solvent that dissolves the monomer. A mixture of one or more solvents may also be used. Useful solvents include, but are not limited to, methanol and diethyl ether. The cross-linking agent is not required if the monomer can cross-link without a cross-linking agent. In one embodiment, the monomer is dissolved in the organic solvent, and then the water and the optional cross-linking agent are added. For monomer 1, casting solutions include, but are not limited to, solutions of approximately 5-11% monomer, 2-3% water, 0.5-1% 2-hydroxy-2-methylpropiophenone, balance methanol.

Application of the solution to the support can be achieved by any solution based process known to the art, including painting, rolling, spraying, and inkjet printing of the solution onto the support. The solution is applied to form a coating on at least a portion of the surface of the support. It is preferred that that coating be free of surface defects such as pinholes and scratches. In one embodiment, a commercial foam painting sponge or other such applicator can be used to apply the solution to the support. In another embodiment, the solution can be applied by roller casting. The amount of material on the support can be controlled by the number of applications and the concentration of the casting solution. For a given casting solution, a single application can produce a lyotropic liquid crystal film with better pore alignment than multiple applications. It is believed that some of the solution penetrates into the support, with the extent of penetration depending on the nature of the solution, the support, and the application process. The penetration of the solution into the support is believed to help attach the cross-linked LLC polymer film to the support.

The solvent may be evaporated from the film by allowing the solvent to evaporate at ambient temperature. Other temperatures and controlled atmospheres as known by those skilled in the art can be used to evaporate the solvent from the film.

The LLC phase can be photo-cross-linked by putting it under UV light in air or nitrogen at ambient temperature. Other temperatures as known by those skilled in the art may be used during the cross-linking process. Other methods of cross-linking as known to those skilled in the art may also be used. For example, thermal cross-linking may be performed using a cationic initiator as a cross-linking agent.

In an embodiment, the invention provides a process for separating a component of a first fluid mixture, the process comprising the steps of:

bringing said first fluid mixture into contact with the inlet side of a separation membrane, said separation membrane comprising a LLC polymer porous membrane attached to a ultraporous support membrane, applying a pressure difference across said separation membrane; and withdrawing from the outlet side of said separation membrane a second fluid mixture wherein the proportion of said component is depleted, compared with said first fluid mixture.

Components which can be separated from a fluid mixture using the membranes of the invention include organic molecules, ions, gases, impurities and other contaminants.

The invention provides methods of size-selective filtration of solutions using the composite membrane of the invention. One or more components such as nanometer-size impurities, organic molecules, certain ions, and other contaminants can be removed from solution by selecting the pore diameter of the LLC membrane to be smaller than the molecular size of the component(s) of interest.

Furthermore, the invention provides methods for other forms of separation processes. If a chemical complexing agent is incorporated into the nanopores of the composite membrane of the invention, the chemical complexing agent can interact reversibly or irreversibly with various solutes that enter the membrane. For example, if metal ions such as $Cu^+$, $Cu^{2+}$, and $Ag^+$ are incorporated into the nanopores, enhanced oxygen separation or separation of olefins from paraffins can be enabled. Amine functionalities would enable enhanced $CO_2$ separation from other gases. Similarly, the incorporation of water-stable catalytic entities in the nanopores of these materials may also offer the option of catalytically degrading organic waterborne contaminants into more biodegradable forms during the nanofiltration process. The incorporation of chemical complexing agents into LLCs is known to the art (Gu, W.; Zhou, W.-J.; Gin, D. L. "A Nanostructured, Scandium-Containing Polymer for Heterogeneous Lewis Acid Catalysis in Water," *Chem. Mater.* 2001, 13 (6), 1949-1951.; Gray, D. H.; Gin, D. L. "Polymerizable Lyotropic Liquid Crystals Containing Transition-Metal Ions as Building Blocks for Nanostructured Polymers and Composites," *Chem. Mater.* 1998, 10 (7), 1827-1832.; Deng, H.; Gin, D. L.; Smith, R. C. "Polymerizable Lyotropic Liquid Crystals Containing Transition-Metal and Lanthanide Ions: Architectural Control and Introduction of New Properties into Nanostructured Polymers," *J. Am. Chem. Soc.* 1998, 120 (14), 3522-3523).

EXAMPLES

Example 1

Fabrication of a Composite Nanofiltration Membrane by Painting

Monomer 1 was dissolved in methanol then water and a commercial radical photo-initiator was added to form a dilute casting solution. The concentration of components in the solution is listed in Table 1. 2-hydroxy-2-methylpropiophenone is a photo-initiator. A commercial foam painting sponge was used to evenly apply the solution on a poly(acrylonitrile-co-methylacrylate), 6% methyl acrylate, PAN support. The support was manufactured by Membrane Technology and Research (Menlo Park, Calif.). The pore size of this support is less than about 0.1 micron. At the support surface the pore sizes typically ranges between about 10 and about 50 nm.

After allowing the methanol to evaporate at ambient temperature, the LC monomer coating was photo-cross-linked by putting it under UV light (365 nm, ca. 1200 µW/cm$^2$) in air for 2 h at ambient temperature.

TABLE 1

| Component of solution (wt %) | Source | Grade/purity |
|---|---|---|
| Monomer 1: 9.53% | Synthesized | pure by NMR |
| Methanol: 87.13% | Aldrich | HPLC grade |
| Water: 2.63% | | de-ionized |
| 2-hydroxy-2-methylpropiophenone: 0.71% | Aldrich | 97% |

The amount of material on the support was controlled by the number of applications and the concentration of the casting solution. It was found that the thinner the nanoporous LC top layer, the better the observed flux through the composite membrane. The flexible supported membrane was then cut to size for testing in commercial filtration cells.

X-ray diffraction (XRD) analysis of the coated film samples showed that the characteristic low-angle XRD peaks for the $H_{II}$ phase were seen on top of the peaks from the semi-ordered PAN support material. The coated membrane was folded five times and placed in the XRD beam in order to get sufficient diffraction intensity. TEM imaging and XRD structural analysis estimates the nanopore size as approximately 1.2 nm.

Example 2

Fabrication of a Composite Nanofiltration Membrane by Roller-Casting

A dilute casting solution was formed as in Example 1. The support was commercial ultraporous polysulfone (PSf) (Hydranautics, P-100, Oceanside, Calif.). The pore size of this support was less than about 0.1 micron.

Figure 5:
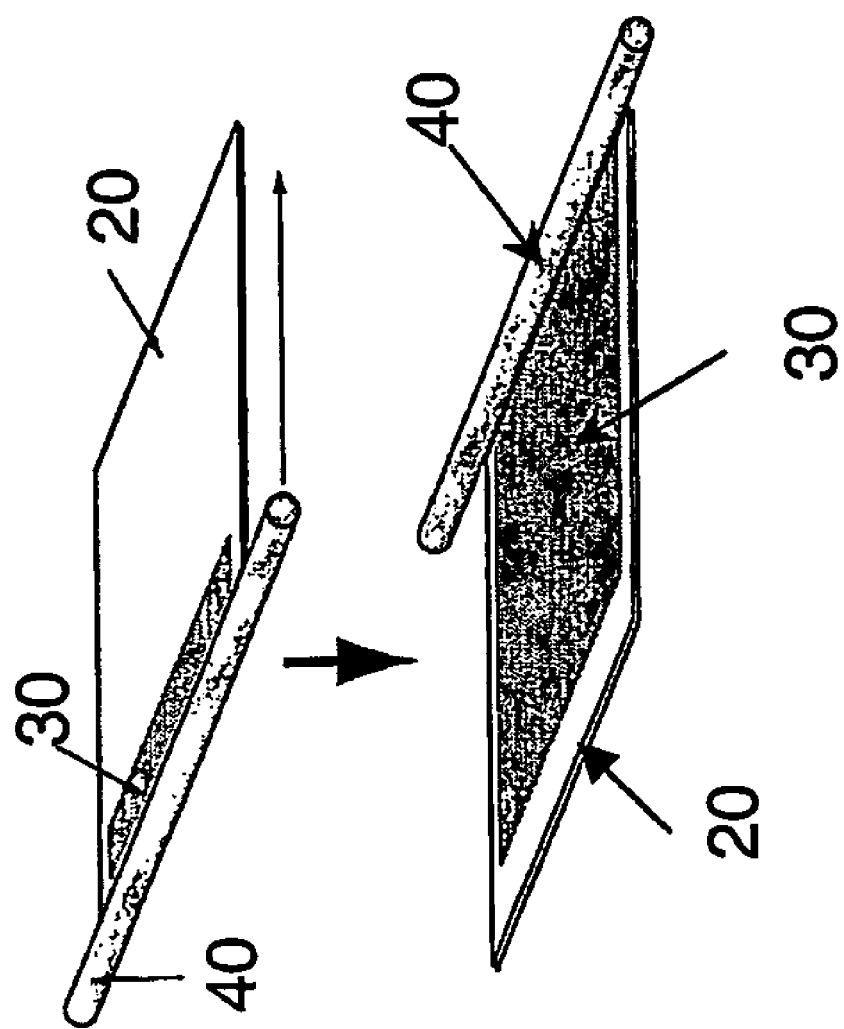
FIG. 5 schematically illustrates the roller casting process.

The roller casting process is schematically shown in FIG. 5. The support (20) was placed on a flat substrate (not shown). As shown in the upper part of FIG. 5, the solution (30) was placed at one edge of the support. A syringe can be used to control placement of the solution. As shown in the lower part of FIG. 5, an applicator rod (40) was then rolled over the support to distribute the solution. Roller guides were placed at the edges of the support to control the height of the roller above the support. The guides may be made of adhesive tape or of any suitable material known to the art. The roller may be a wire-wound stainless rod, a glass rod, or similar roller type applicator.

After allowing the methanol to evaporate at ambient temperature, the LC monomer coating was photo-cross-linked by putting it under UV light (365 nm, ca. 1200 µW/cm$^2$) in a nitrogen flushed acrylic glove box anywhere from 2 hours to overnight at ambient temperature. In particular, to minimize O$_2$ inhibition of the radical photopolymerization process especially for sub-micron coatings, the LLC coated membranes are placed in a sealed large area photopolymerization cell, evacuated with dynamic vacuum to remove ambient and dissolved O$_2$, and then flushed with N$_2$ during photolysis. This procedure allows degrees of polymerization of greater than 80% to be achieved reproducibly with submicron coated films.

Using this procedure, uniform thin (approximately 0.3 micron) coatings were obtained over a 6 by 9 cm area.

Example 3

Size Selective Filtration Using a Composite Nanofiltration Membrane

The composite membrane comprising a layer of LLC polymer (thickness less than 1 micron, approximately 0.3 micron) on an ultraporous PAN support described in Example 1 was cut to size and placed in a commercial 25 mm diameter dead-end filtration cell (Advantec UHP25). Upon application of an applied pressure of ca. 60 psi (0.4137 MPa) of nitrogen gas, water solution fluxes on the order of 0.263-0.789 kg/m$^2$ hour were achieved through the membrane. For 3-layer approximately 1 micron films, the water solution fluxes were approximately half that of the one layer films.

Figure 6A:
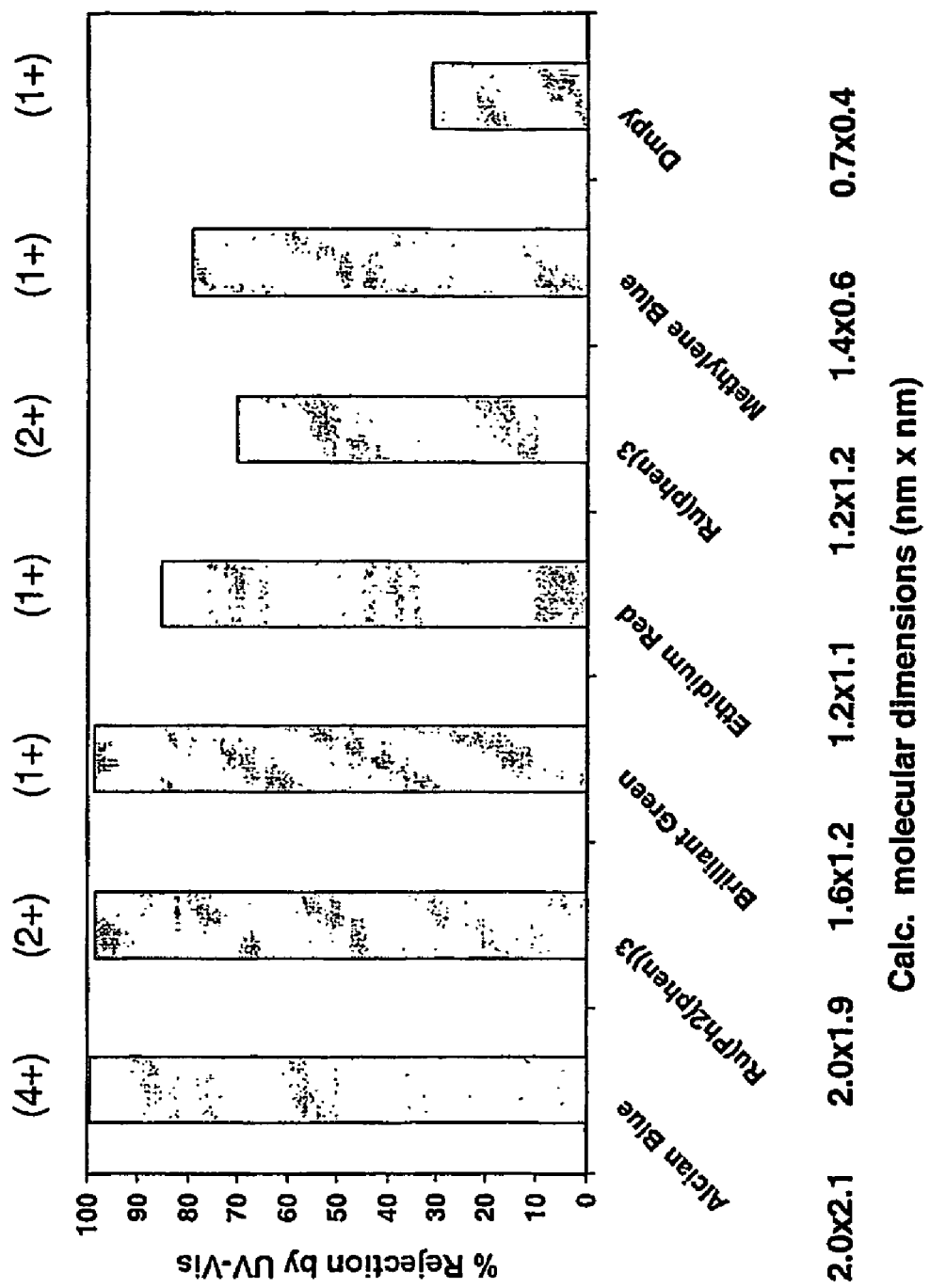
FIG. 6A illustrates the percent dye rejected during flow of a dye solution through a membrane of the invention for various cationic dyes.
Figure 6B:
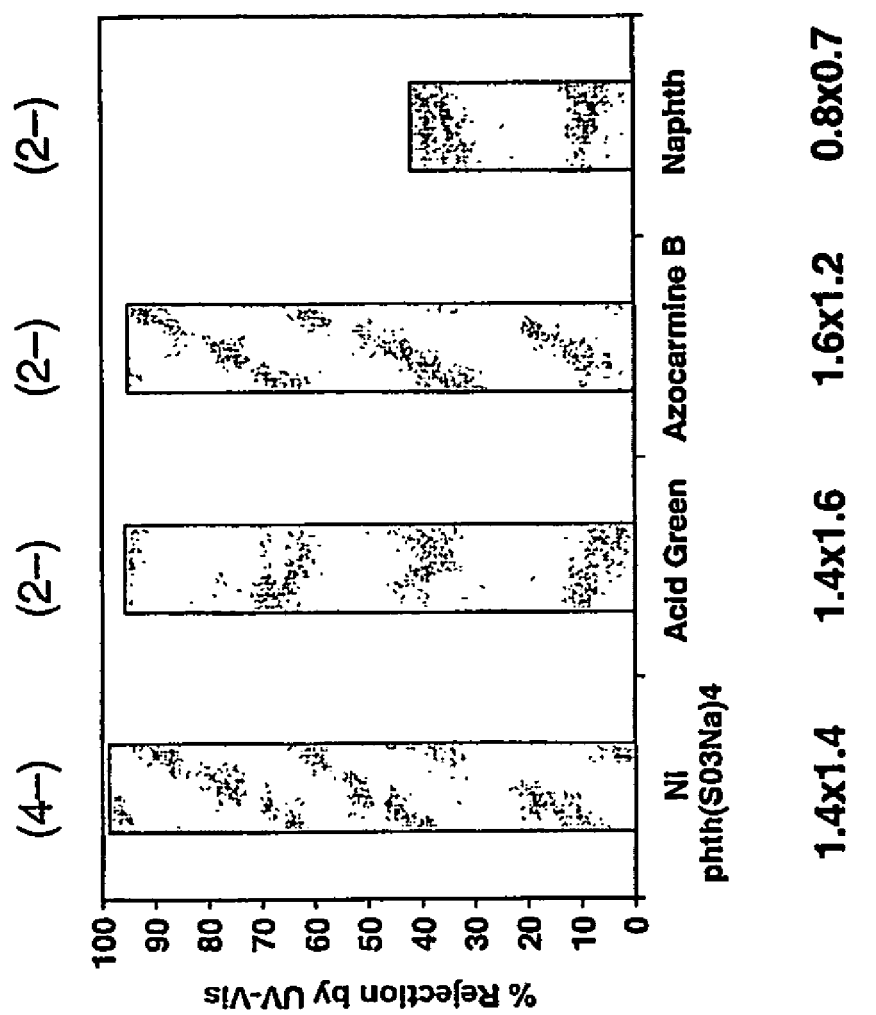
FIG. 6B illustrates the percent dye rejected during flow of a dye solution through a membrane of the invention for various anionic dyes.

Using this configuration, highly selective molecular size filtration of water-soluble molecules in water has been demonstrated. When a water solution of a blue dye (Alcian Blue pyridine variant) with a molecular diameter (2.0 nm) slightly larger than the nanopores was passed through the membrane, the blue dye was completely filtered out. No trace of the blue dye was present in the filtrate solution, as confirmed by UV-visible spectroscopy. When a water solution of a red dye (phenol sulfone phthalein) with a diameter (0.96 nm) much smaller than the nanopores was passed through the membrane, the red dye was able to pass through. Finally, when a 1/1 water mixture of the large blue dye and the small red dye (green color solution) was forced through the LC-coated membrane, a red solution was produced via filtration, indicating molecular size selectivity. Spectroscopic analysis of the filtered solution only showed the presence of the red dye, indicating complete rejection of the large blue dye Additional nanofiltration experiments with cationic, rigid dyes of different molecular sizes, such as Methylene Blue, Brilliant Green, and Ethidium Red, have subsequently revealed that the effective diameter of the nanopores is ca. 1.2-1.4 nm. FIGS. 6A and 6B show plots of single dye rejection as a function of dye size and charge. The experiments in FIGS. 6A and 6B shows that molecular sieving with these membranes is a general phenomenon that works for both cationic and anionic molecules. Furthermore, the uncoated support was unable to achieve the selectivity of the composite LLC membrane.

Those of ordinary skill in the art will appreciate that materials and methods other than those specifically described herein can be employed in the practice of this invention without departing from the scope of this invention.

All references cited herein are hereby incorporated by reference in their entirety to the extent that they are not inconsistent with the disclosure herein.

We claim:

1. A composite membrane comprising:
   a porous support; and a lyotropic liquid crystal (LLC) polymer porous membrane attached to the support, the LLC membrane having a thickness less than about 1 micron and a pore structure having hexagonally ordered, cylindrical nanopores.

2. The composite membrane of claim 1, wherein the pore size of the support is less than about 0.1 micron.

3. The composite membrane of claim 1, wherein the thickness of the LLC membrane is less than about 0.5 microns.

4. The composite membrane of claim 1, wherein the LLC membrane is a single layer.

5. The composite membrane of claim 1, wherein the porous support is selected from the group consisting of polyacrylonitrile (PAN), polyacrylonitrile-co-polyacrylate, polyacrylonitrile-co-methylacrylate, polysulfone (PSf), Nylon 6, 6, poly(vinylidene difluoride), and polycarbonate supports.

6. The composite membrane of claim 1 wherein the composite membrane has a flux of an aqueous solution of at least 0.2 kg/(m$^2$ hr) with a pressure differential of 60 psi (0.4137 MPa).

7. The composite membrane of claim 1 wherein the pores of said LLC polymer membrane incorporate a chemical complexing agent.

8. The membrane of claim 1, wherein the LLC polymer is formed of polymerized LLC monomers in an ordered assembly and optionally a crosslinking agent and the LLC monomers form the inverted hexagonal phase.

9. The membrane of claim 1, wherein the LLC polymer penetrates into the pores of the support.

10. A composite membrane comprising:
a porous support; and
a lyotropic liquid crystal (LLC) polymer porous membrane attached to the support, the LLC membrane having a thickness less than about 10 microns and a pore structure of interconnected, ordered, 3-D nanopores.

11. The composite membrane of claim 10 wherein the pore size of the support is less than about 0.1 micron.

12. The membrane of claim 10, wherein the porous support is selected from the group consisting of polyacrylonitrile (PAN), polyacrylonitrile-co-polyacrylate, polyacrylonitrile-co-methylacrylate, polysulfone (PSf), Nylon 6, 6, poly(vinylidene difluoride), and polycarbonate supports.

13. The membrane of claim 10, wherein the pores of said LLC polymer membrane incorporate a chemical complexing agent.

14. The membrane of claim 10, wherein the LLC polymer is formed of polymerized LLC monomers in an ordered assembly and optionally a crosslinking agent and the LLC monomers form a bicontinuous cubic phase.

15. The membrane of claim 10, wherein the LLC polymer penetrates into the pores of the support.

16. A method for making a composite nanofiltration membrane comprising an ultraporous support and a LLC polymer porous membrane attached to the support, the method comprising the steps of:
providing the ultraporous support;
preparing a solution comprising a LLC monomer, an organic solvent for the monomer, a polymerization initiator and water, wherein the organic solvent is selected to be compatible with the support;
applying a layer of the solution onto the support;
evaporating the solvent from the solution; and
cross-linking the LLC monomer.

17. The method of claim 16 wherein the solution is applied to the support by roller casting.

18. The method of claim 16 wherein the pore size of the support is less than about 0.1 micron.

19. The method of claim 16 wherein the LLC monomer is selected from the group consisting of inverted hexagonal ($H_{II}$) forming monomers and bicontinuous cubic (Q) forming monomers.

20. The method of claim 16 wherein the LLC monomer forms the inverted hexagonal phase.

21. The method of claim 20 wherein the LLC polymer membrane thickness is less than about 1 micron.

22. The method of claim 20 wherein the LLC polymer membrane thickness is less than about 0.5 microns.

23. The method of claim 16 wherein the LLC monomer forms the bicontinuous cubic phase.

24. The method of claim 23 wherein the LLC polymer membrane thickness is less than about 10 microns.

25. The method of claim 16, wherein the porous support is selected from the group consisting of polyacrylonitrile (PAN), polyacrylonitrile-co-polyacrylate, polyacrylonitrile-co-methylacrylate, polysulfone (PSf), Nylon 6, 6, poly(vinylidene difluoride), and polycarbonate supports.

26. A method for making a composite nanofiltration membrane comprising a porous support and a LLC polymer porous membrane attached to the support, the method comprising the steps of:
providing the porous support;
preparing a solution comprising a LLC monomer, an organic solvent for the monomer, a polymerization initiator, and water, wherein the monomer forms the inverted hexagonal phase and the organic solvent is selected to be compatible with the support;
applying a layer of the solution onto the support;
evaporating the solvent from the solution; and
cross-linking the LLC monomer, whereby the thickness of the LLC polymer porous membrane is less than about 1 micron.

27. A method for making a composite nanofiltration membrane comprising a support and a LLC polymer porous membrane attached to the support, the method comprising the steps of:
providing a porous support;
preparing a solution comprising a LLC monomer, an organic solvent for the monomer, a polymerization initiator, and water, wherein the monomer forms the bicontinuous cubic phase and the organic solvent is selected to be compatible with the support;
applying a layer of the solution onto the support;
evaporating the solvent from the solution; and
cross-linking the LLC monomer, whereby the thickness of the LLC polymer porous membrane is less than about 10 microns.

28. A process for separating a component of a first fluid mixture, comprising the steps of:
bringing said first fluid mixture into contact with the inlet side of a separation membrane, said separation membrane comprising a LLC polymer porous membrane attached to a ultraporous support membrane, wherein the pore structure of the LLC polymer porous membrane has hexagonally ordered, cylindrical nanopores or interconnected, ordered, 3-D nanopores, applying a pressure difference across said separation membrane; and
withdrawing from the outlet side of said separation membrane a second fluid mixture, wherein the proportion of said component is depleted, compared with said first fluid mixture.

29. The process of claim 28, wherein the pores of said LLC polymer membrane are smaller than the molecular size of said component.

30. The process of claim 28, wherein the pores of said LLC polymer membrane incorporate a chemical complexing agent.

* * * * *

UNITED STATES PATENT AND TRADEMARK OFFICE
CERTIFICATE OF CORRECTION

PATENT NO. : 7,604,129 B2 Page 1 of 1
APPLICATION NO. : 10/529409
DATED : October 20, 2009
INVENTOR(S) : Gin et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1000 days.

Signed and Sealed this

Fifth Day of October, 2010

David J. Kappos
*Director of the United States Patent and Trademark Office*

UNITED STATES PATENT AND TRADEMARK OFFICE
CERTIFICATE OF CORRECTION

PATENT NO. : 7,604,129 B2
APPLICATION NO. : 10/529409
DATED : October 20, 2009
INVENTOR(S) : Douglas L. Gin, Meijuan Zhou and Richard Noble Page 1 of 1

It is certified that error appears in the above-identified patent and that said Letters Patent is hereby corrected as shown below:

Cover page, Assignee item (73), replace "Univeristy" with --University--

Signed and Sealed this
Twenty-fifth Day of January, 2011

David J. Kappos
*Director of the United States Patent and Trademark Office*